United States Patent
Coxon et al.

(10) Patent No.: US 6,170,648 B1
(45) Date of Patent: Jan. 9, 2001

(54) ANGLE STATION

(75) Inventors: Alan Coxon, Whitley Bay; Norman Charles Hadley, Lower Tean; John Pattison, deceased, late of Chester le Street, all of (GB), by Ann Pattison, legal representative

(73) Assignee: Continental Conveyor Ltd., Wakefield (GB)

(*) Notice: Under 35 U.S.C. 154(b), the term of this patent shall be extended for 0 days.

(21) Appl. No.: 09/180,973

(22) PCT Filed: May 13, 1997

(86) PCT No.: PCT/GB97/01284

§ 371 Date: Nov. 17, 1998

§ 102(e) Date: Nov. 17, 1998

(87) PCT Pub. No.: WO97/44268

PCT Pub. Date: Nov. 27, 1997

(30) Foreign Application Priority Data

May 17, 1996 (GB) .................................................. 9610403

(51) Int. Cl.[7] .................................................. B65G 15/60
(52) U.S. Cl. ......................... 198/839; 198/837; 198/831
(58) Field of Search ..................... 198/839, 831, 198/837

(56) References Cited

U.S. PATENT DOCUMENTS

| | | | |
|---|---|---|---|
| 1,919,705 | * 7/1933 | Petersen | 198/839 |
| 4,685,553 | * 8/1987 | Jennings | 198/839 |
| 4,834,839 | * 5/1989 | Harrison | 198/839 |
| 4,986,413 | * 1/1991 | Mraz | 198/839 |

FOREIGN PATENT DOCUMENTS

| | | | |
|---|---|---|---|
| 1207269 | * 12/1963 | (DE) | 198/839 |
| 0109787 | * 5/1954 | (EP) | 198/839 |
| 709019 | * 5/1954 | (GB) | 198/839 |
| 1 048 256 | 11/1966 | (GB) . | |
| WO8504640 | 10/1985 | (WO) . | |
| WO9306028 | 4/1993 | (WO) . | |

* cited by examiner

*Primary Examiner*—Robert P. Olszewski
*Assistant Examiner*—Steven B. McAllister
(74) *Attorney, Agent, or Firm*—Alston & Bird LLP

(57) ABSTRACT

The present invention relates to an angle station 3 for lateral angular displacement of an endless conveyor belt 2 in a conveyor system. The angle station 3 comprises a belt guide in the form of a multiplicity of guide rollers 22 mounted on a roller support. The guide rollers 22 are arranged in an axially and laterally extending array, so as to define a generally continuously curved support for a conveyor belt 2 in use of the angle station 3. The roller support comprise an elongate support member 24 provided with a plurality of roller support elements 26 mounting roller mounting members 28 which are arranged along a plurality of axially spaced substantially helical pathways C, D, E, F. The roller support elements 26 project from the elongate support member 24 and the elongate support member 24 is laterally offset and spaced from a common longitudinal axis of the helical pathways for the roller mounting members 28 so that the space radially inwards of the helical pathway is substantially unobstructed. The advantage of the arrangement is that the build up of particulate material around the rollers 22 is substantially avoided which, in turn, leads to more effective and energy efficient operation of the angle station 3.

16 Claims, 9 Drawing Sheets

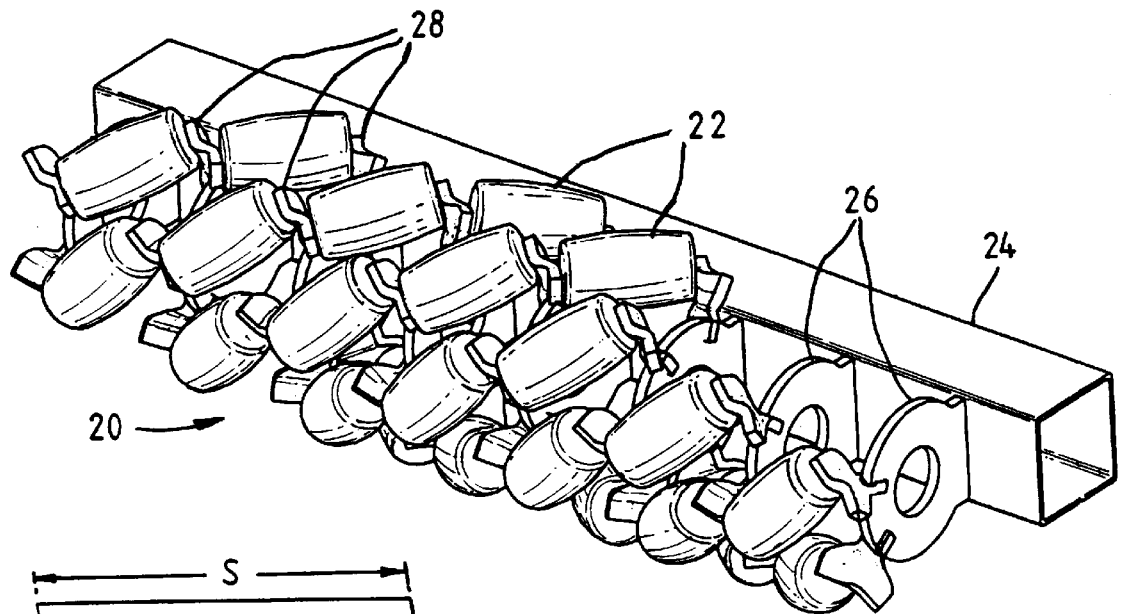
FIG. 3(a)
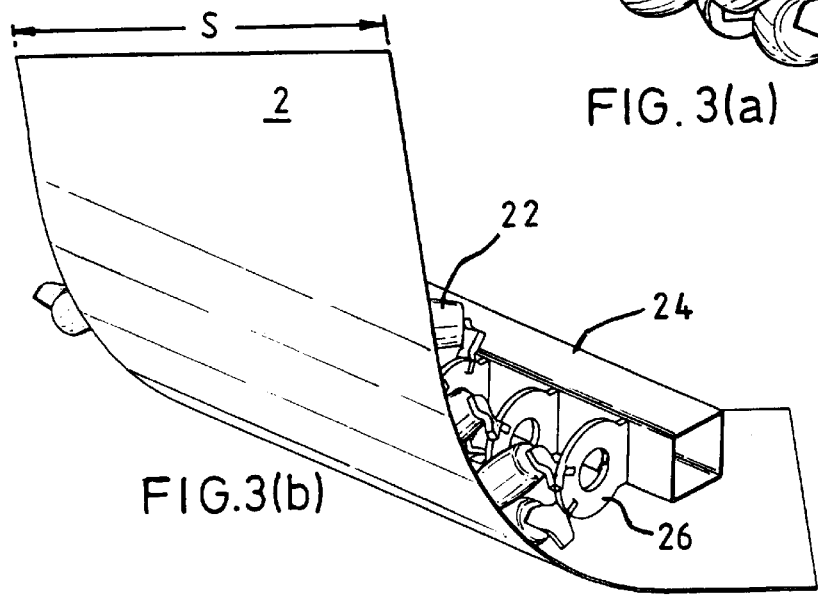
FIG. 3(b)
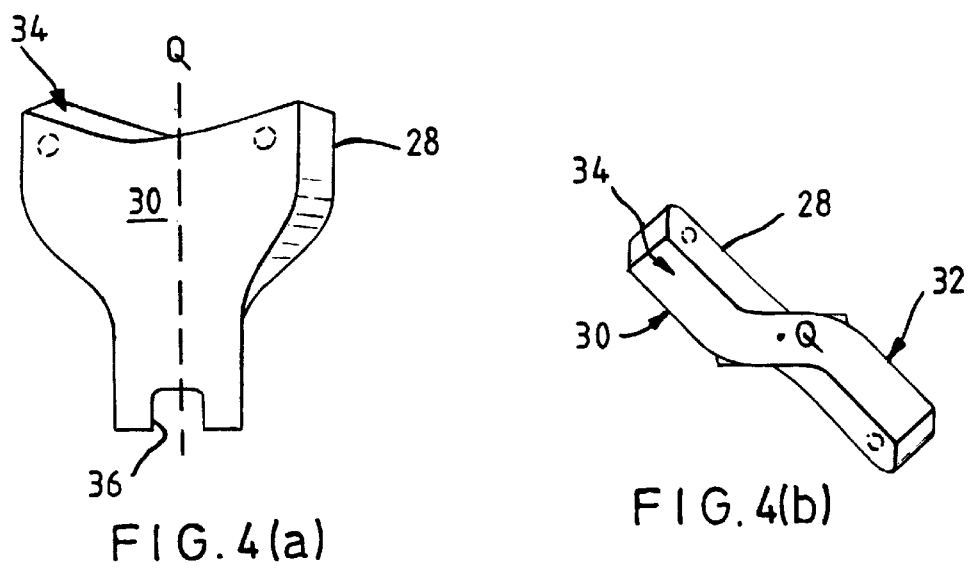
FIG. 4(a)
FIG. 4(b)

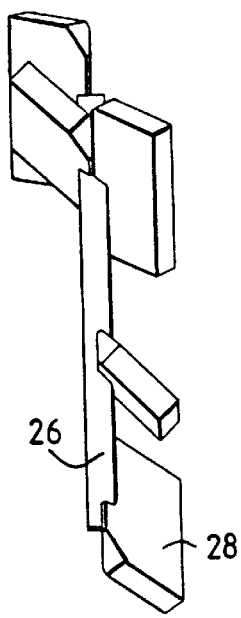 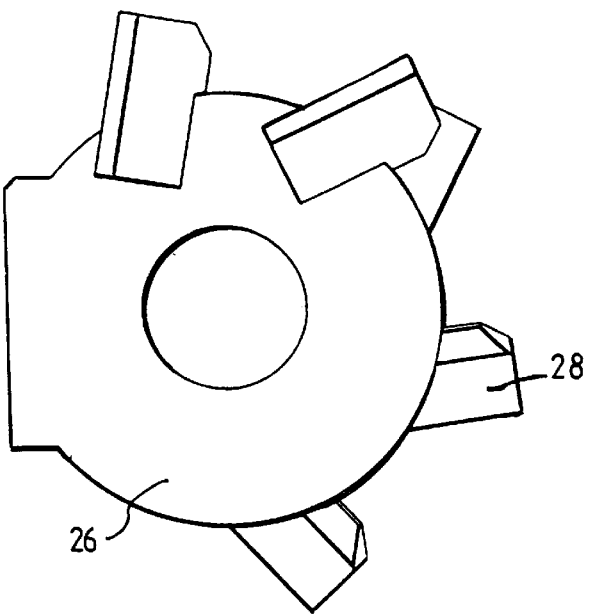
FIG. 19  FIG. 20
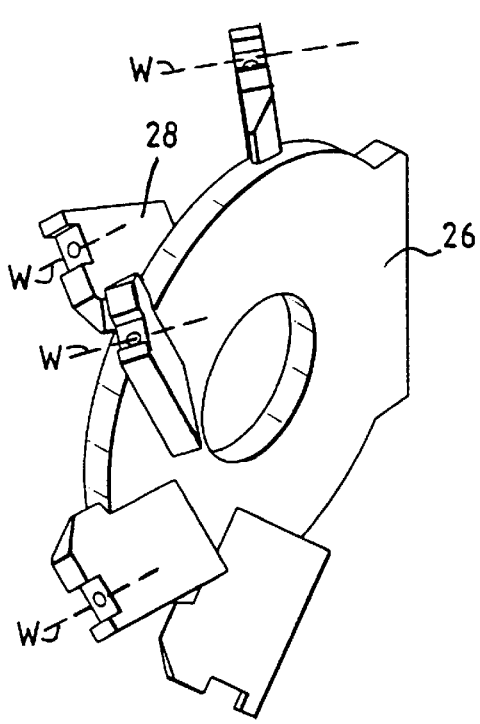 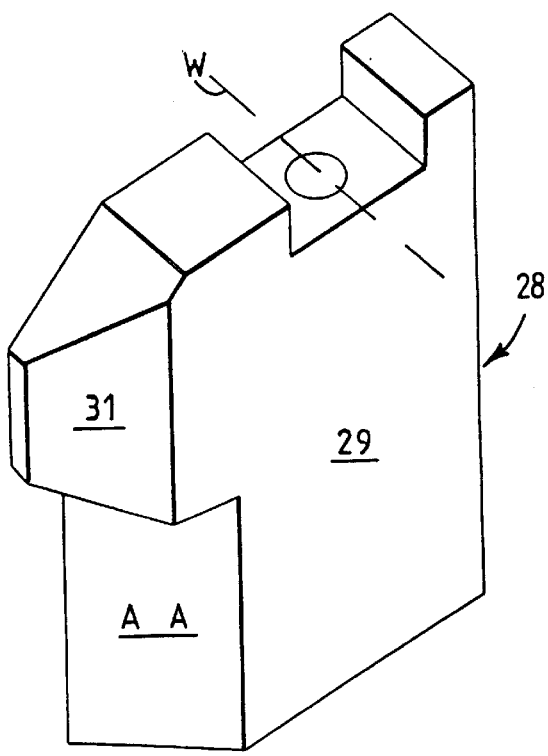
FIG. 21  FIG. 22

ANGLE STATION

BACKGROUND OF THE INVENTION

The present invention relates to angle stations in or for endless conveyor belts and to guide roller mounting elements, and guide rollers, for use therein.

The main function and purpose of an angle station is to enable an endless conveyor to change its direction of travel laterally e.g. so as to negotiate a bend along its route. The basic principle behind most angle stations is to allow an endless conveyor belt to move over a helical path of low frictional resistance, invariably provided by some form of guide roller arrangement.

One such angle station is described in our International Patent Application, Publication No. WO93/06028. In this angle station, conveyor belt guide means in the form of a plurality of guide rollers define a generally continuously curved support for the belt. Each roller is generally barrel-shaped and is individually mounted in a generally U-shaped support bracket with a generally concave, part-cylindrical surface, base formed and arranged for complementary engagement with a cylindrical support surface of a support structure.

A disadvantage of the angle station of WO93/06028 is that dirt and debris can accrete around the support brackets, between the rollers and the support structure, which can impede rotation of the rollers, resulting in reduced performance and increased energy consumption of the angle station. Angle stations are often used in hostile industrial environments such as mines, quarries and ore plants, where they are exposed to significant amounts of dirt and other particulate foreign matter and where there is accordingly a risk of clogging occurring.

SUMMARY OF THE INVENTION

It is an object of the present invention to avoid or reduce one or more of the foregoing disadvantages.

According to a first aspect the present invention provides an angle station for lateral angular displacement of an endless conveyor belt in a conveyor system, which angle station comprises a belt guide means in the form of a multiplicity of guide rollers mounted on roller support means, with said guide rollers arranged in an axially and laterally extending array, so as to define a generally continuously curved support for a said conveyor belt in use of the angle station, wherein said roller support means comprises an elongate support member provided with a plurality of roller support elements mounting roller mounting members which are arranged along a plurality of axially spaced substantially helical pathways, said roller support elements projecting from said elongate support member and said elongate support member being laterally offset and spaced from a common longitudinal axis of said helical pathways for said roller mounting members so that the space radially inwards of said helical pathways is substantially unobstructed whereby build-up of particulate material around the rollers is substantially avoided.

One advantage of the angle station according to the above first aspect of the invention is that the clogging problem due to build up of dirt and/or debris is substantially avoided which, in turn, leads to more effective and energy efficient operation of the angle station.

Preferably, a plurality of the roller mounting members of at least one of said helical pathways of roller mounting members are each formed and arranged for mounting roller ends of rollers disposed laterally on opposite sides of said at least one helical pathway. An advantage of this arrangement is that it enables an extremely close-packed arrangement of the guide rollers to be achieved, this allows increased, more uniform, support to be provided to a conveyor belt in use, in turn reducing wear on the belt caused by scuffing.

Said roller support elements may be in the form of discs or rings on which said roller mounting members are mounted. Each disc or ring preferably has two substantially planar opposing surfaces. Where said roller support elements are in the form of such discs or rings, said discs or rings preferably project laterally from an outer face of the elongate support member such that the plane of each disc or ring is substantially normal to the longitudinal axis of said helical pathways for the roller mounting portions. This arrangement has the advantage that, in use, where the elongate support member is disposed substantially horizontally so that the discs or rings project laterally from the support member, the substantially planar surfaces of said discs or rings are disposed substantially vertically and are thus less likely to harbour dirt or debris than, for example, horizontally disposed surfaces.

Said elongate support member may be a tubular member which may be of substantially rectangular or, alternatively, substantially non-angular cross-section. The guide rollers are preferably large diameter rollers, the roller diameter being relatively large with respect to the diameter of the substantially helical pathways of the roller mounting portions. The maximum diameter of the rollers is desirably from 0.18 to 0.30 times, advantageously 0.24 times the helical pathway diameter.

Each of said guide rollers is preferably mounted at its ends, for rotational movement about its own axis, on two of said roller mounting members mounted on the roller support elements.

Said roller mounting members may be provided as a plurality of helical rails which are mounted on the roller support elements. Each helical rail may be formed integrally or may consist of a plurality of rail portions which may be assembled to form the rail. Each of such helical rails may be formed and arranged for mounting a plurality of roller ends.

Alternatively, said roller mounting members may comprise a plurality of brackets which are mounted on the roller support elements. At least some of said brackets may each be formed and arranged for mounting two roller ends of respective ones of two different rollers. The bracket members may each be substantially in the shape of a whale's tail. Alternatively said roller mounting member may be in the form of a mounting block secured to said roller support element for mounting one end of a said roller and have a shape generally similar to one half of whale's tail, which can, conveniently, be formed by, for example, milling more or less readily from flat plate.

According to a second aspect the invention provides an angle station for lateral angular displacement of an endless conveyor belt in a conveyor system, which angle station comprises a belt guide means in the form of a multiplicity of guide rollers mounted in roller support means, with said guide rollers arranged in a closely packed, axially and laterally, extending array, so as to define a generally continuously curved support for a said conveyor belt in use of the angle station, wherein said roller support means comprises an elongate support member of substantially non-angular cross-section mounting a plurality of roller mounting elements which extend along a plurality of axially spaced substantially helical pathways, the roller mounting element(s) of at least one of said helical pathways being formed and arranged for mounting roller ends of rollers disposed laterally on opposite sides of said at least one helical pathway of roller mounting elements.

One main advantage of the angle station according to the second aspect of the invention is that it enables an extremely close-packed arrangement of guide rollers to be achieved, thus providing increased and more uniform support to a conveyor belt, in use of the angle station. This arrangement can also reduce the number of roller mounting elements necessary to mount a chosen number of rollers, where opposite sides of the same element are used to mount rollers which means that there are fewer elements for dirt and/or debris to accumulate around near the rollers.

Said roller mounting elements may be provided in the form of helical rails which may be mounted directly to said elongate support member. The helical rails may be formed integrally or may comprise a plurality of rail portions which may be assembled to form the helical rails. The helical rails are preferably each formed and arranged for mounting a plurality of roller ends of rollers disposed laterally on opposite sides of the rail.

Alternatively, said elongate support member and said roller mounting elements may be formed integrally as a fabricated assembly. In this case, alternate roller mounting elements of said at least one helical pathway of roller mounting elements preferably mount roller ends of rollers disposed on the same side of said at least one helical pathway.

Advantageously, said roller mounting elements are provided in the form of a plurality of bracket members which are mounted directly on said elongate support member. At least some of said bracket members may each be formed and arranged for mounting two roller ends of respective ones of two different guide rollers.

Advantageously, for a conveyor belt of predetermined width, said guide rollers have a length such that three, or preferably four, of said rollers are required to support substantially the full width of the belt.

According to a third aspect, the invention provides a roller mounting element for use in mounting at least one guide roller in an angle station, said roller mounting element comprising a bracket configured for mounting two roller ends of respective ones of two different guide rollers. The bracket may be configured substantially in the form of a hale's tail, or of a similar shape which could advantageously be manufactured more or less readily from flat plate in a complete form. Preferably for use in mounting a roller end of a roller for supporting the side of a belt, said bracket is configured for mounting one roller end only and has a shape generally similar to one half of a said whale's tail. Desirably said bracket for mounting roller ends is a composite bracket comprising two of said brackets for mounting two rollers ends of respective one of two different rollers mounted in a side-by-side relationship on said roller support elements.

According to a fourth aspect of the invention there is provided a guide roller having a cambered substantially cylindrical outer surface and two end surfaces which each meet said cambered substantially cylindrical outer surface at a respective rounded edge, wherein the radius of curvature of said rounded edges decreases gradually from about 0.12 times to about 0.015 times the radius of the camber as said cambered substantially outer surface approaches said end surfaces.

One advantage of such a roller is that damage to a conveyor belt supported by a guide roller due to indentation of the belt by the edges of the roller, particularly where the belt is stationary for any length of time, is minimised or substantially avoided.

Preferably, the radius of curvature decreases gradually from 0.106 times to about 0.015 times the radius of the camber. For example, said radius of curvature may decrease gradually from 70 mm to 12 mm, the diameter of said guide roller being in the range of 130 mm to 170 mm at its greatest magnitude, subtantially halfway along the length of the roller and in the range of 90 mm to 130 mm at its smallest magnitude at the ends of the roller. The length of the roller may be from 0.15 to 0.35 times, advantageously about 0.22 times, the width of the conveyor belt.

BRIEF DESCRIPTION OF THE DRAWINGS

Preferred embodiments of the invention will now be described, by way of example only, and with reference to the accompanying drawings in which:

FIG. 3(a) is a detailed perspective view of an assembly of guide rollers mounted on roller supporting apparatus in an angle station in accordance with the invention;

FIG. 3(b) is a detail perspective view of the assembly of guide rollers and the roller apparatus shown in FIG. 2 supporting a portion of an endless conveyor belt;

FIGS. 4(a) and (b) are schematic side and top views respectively of a guide roller mounting member of the roller supporting apparatus shown in FIGS. 2 and 3;

FIGS. 15–23 show another embodiment of the invention.

DETAILED DESCRIPTION OF THE INVENTION

Figure 1A:
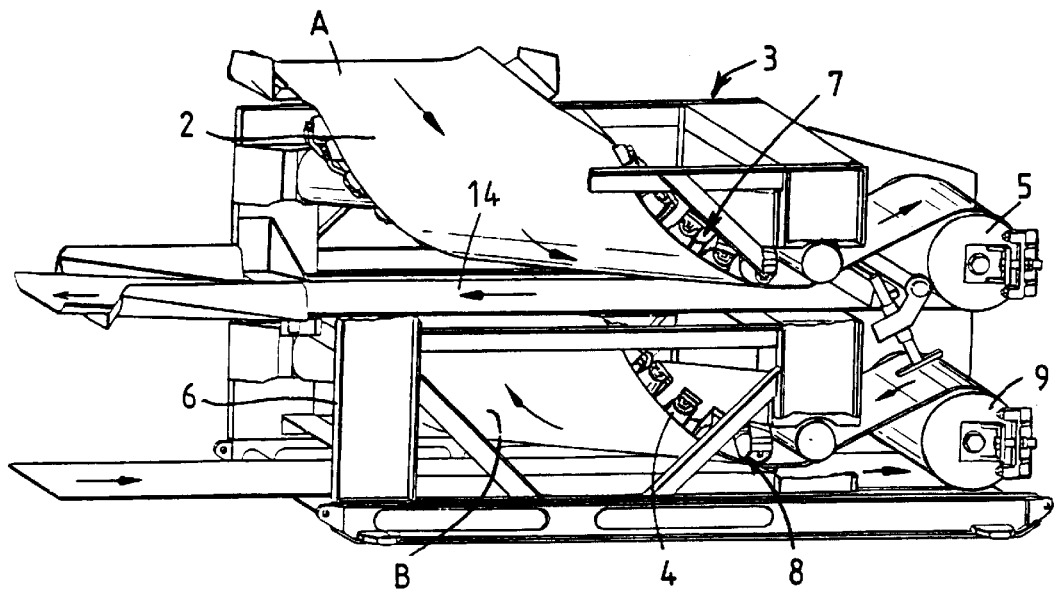
FIG. 1(a) is a general perspective view of a portion of a prior art angle station of a conveyor belt installation.

FIG. 1(a) shows part of a conveyor belt angle station 3 of a conveyor belt installation, as described in WO93/06028.

An endless conveyor belt 2 is routed through the conveyor belt angle station 3, the conveyor belt 2 passing over and around a multiplicity of guide rollers 4 and a plurality of return support rollers 5 mounted on a support framework 6.

As described in full detail in WO93/06028 which is incorporated by reference herein, an incoming reach A of the belt 2 is routed along a helical belt pathway which has a length of one half of a turn (180 degrees) and extends around a first roller assembly 7, a return support roller 5 and out of the angle station. A return reach B of the belt follows a reverse path to that of the incoming belt reach A, extending around a second identical roller assembly 8, a second return support roller 9 and out of the angle station, as shown in FIG. 1(a).

Figure 1B:
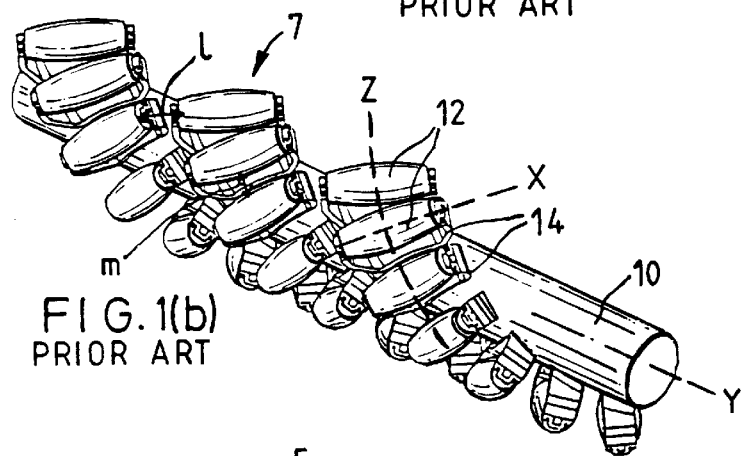
FIG. 1(b) is a detail perspective view of an assembly of guide rollers of the angle station of FIG. 1(a), mounted on a cylindrical support.

FIG. 1(b) shows in detail one of the roller assemblies 7,8 on a cylindrical support in the form of a pipe 10 fixed to the support framework 6 of the angle station. The assembly 10 comprises an axially and laterally extending array of cambered rollers 12 each mounted in a respective generally U-shaped support bracket 14 secured to the pipe 10 such that the guide roller rotational axis X is angularly offset from the longitudinal axis Y of the pipe 10 so that the guide roller 12 is supported substantially normally to a helical pathway Z of the belt 2.

Figure 2A:
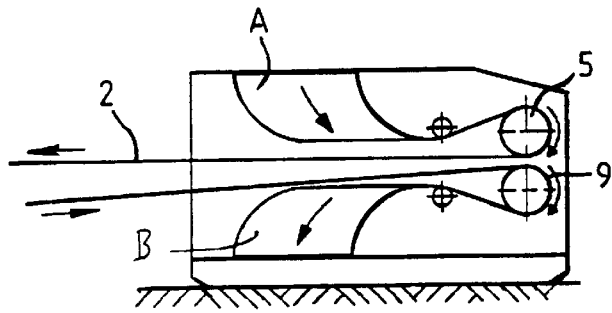
FIG. 2(a) is a schematic side view of a portion of another angle station.
Figure 2B:
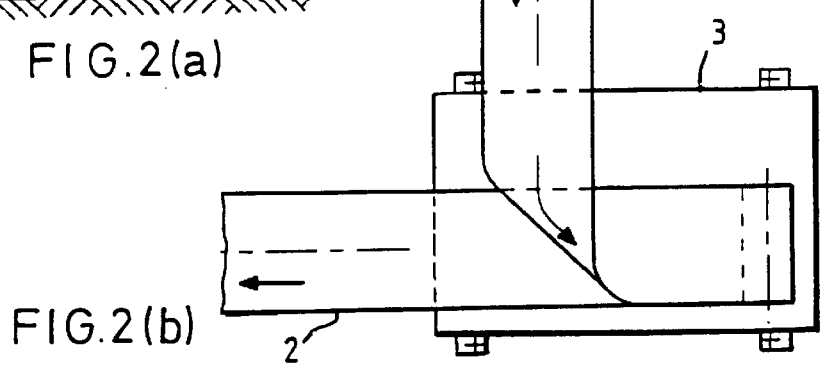
FIG. 2(b) is a schematic top view of the angle station of FIG. 2(a)

FIGS. 2(A) and 2(b) show side and top views respectively of an alternative angle station 3 in which the return reach B of the belt 2 follows an opposite-handed helical path to the helical path followed by the incoming reach A of the belt 2. First and second roller assemblies (not shown) are used to guide the incoming and return reaches respectively of the belt 2 along their helical paths in a similar manner to the angle station of FIG. 1(a). The advantage of this arrangement can be seen when one considers that the conveyor belt 2 will nearly always have a "dirty side" which carries the material or goods to be conveyed (e.g. coal, where the conveyor belt installation is used in a coal mine) and a "clean side" which is not in direct contact with the material or goods being conveyed. The advantage of the arrangement of FIG. 2(a) is that the "clean side" of each of the return reach B of the belt 2 and the incoming reach A of the belt passes over the respective guide roller assembly.

Figure 5:
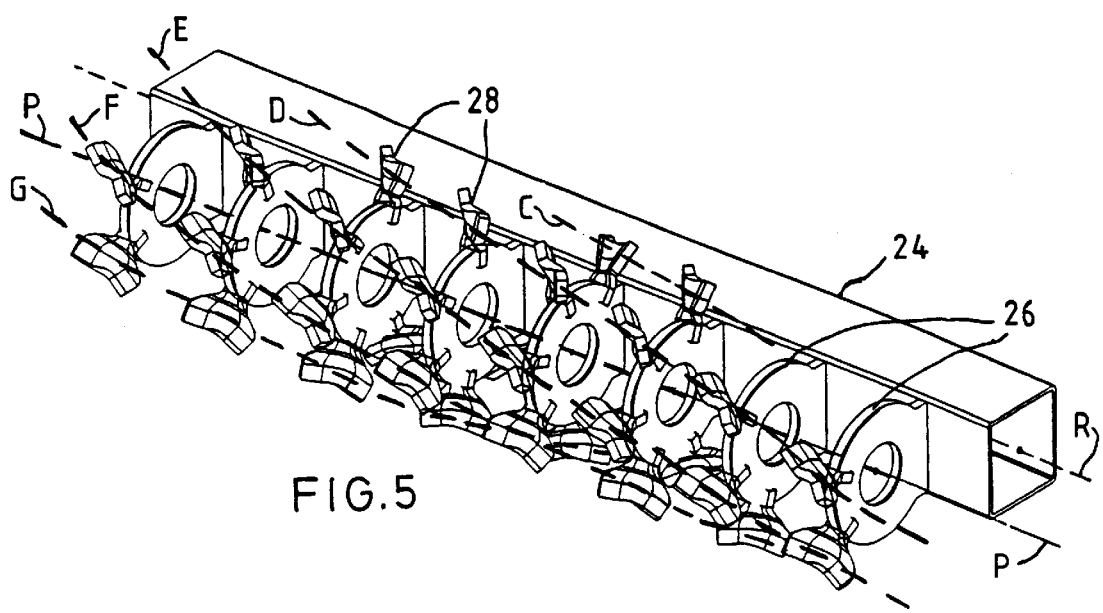
FIG. 5 is a detail perspective view of the roller supporting apparatus of FIG. 2 without the guide rollers.

FIG. 3(a) shows an improved assembly of guide rollers 20 mounted on improved supporting apparatus, for the angle station 3 of FIG. 1(a) or FIG. 2(a), in accordance with the present invention. The assembly comprises a multiplicity of guide rollers 22 which are mounted on roller supporting apparatus in the form of an elongate hollow tube 24 of rectangular cross-section which is provided with a plurality of roller support elements in the form of substantially planar rings 26 which project laterally from an outer surface of the hollow tube 24. The rings 26 are arranged in a row along the side of the tube 24 in substantially parallel spaced apart relation to each other, the plane of the rings being substantially perpendicular to the axis of the elongate tube 24. A multiplicity of roller mounting brackets 28 are mounted on the rings 26, each ring 26 mounting two or more of the brackets 28. The brackets 28 extend along a plurality of helical pathways C,D,E,F,G—(indicated by broken lines) having a common axis P which passes through the centres of the rings 24 as illustrated in FIG. 5 where, for clarity, the guide rollers have been omitted. The axis P is laterally offset and spaced from the axis R of the hollow tube 24.

As shown in FIGS. 4(a) and (b) each of the brackets 28 is configured substantially in the shape of a whale's tail, having a relatively broad upper end with two fin-like portions and narrowing to a relatively slender lower end for mounting the bracket on a respective ring 26. The bracket is slightly twisted about its axis Q, giving the bracket a somewhat S-shaped end face at its relatively wide end. Each bracket 28 is capable of mounting two roller ends of respective ones of two separate rollers, each roller end being mounted on a respective one of the two fin-like portions, on opposing faces 30,32 of the whale's tail bracket 28. Each bracket 28 has a slot 36 defined in the lower end thereof for slotting the bracket onto one of the rings 26 where it is secured thereto by bonding, welding or by mechanical means e.g. screws.

Figure 6:
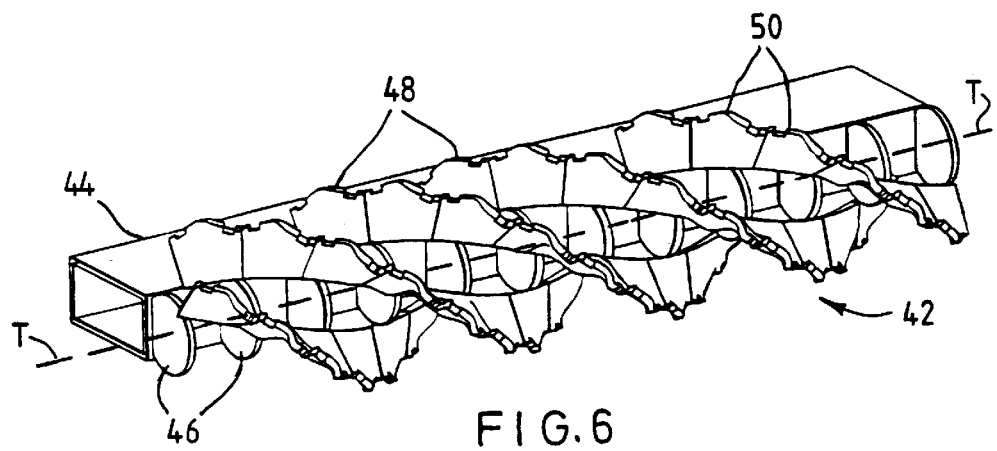
FIG. 6 is a detail perspective view of an alternative roller supporting apparatus for an assembly of rollers of an angle station in accordance with the invention.
Figure 7:
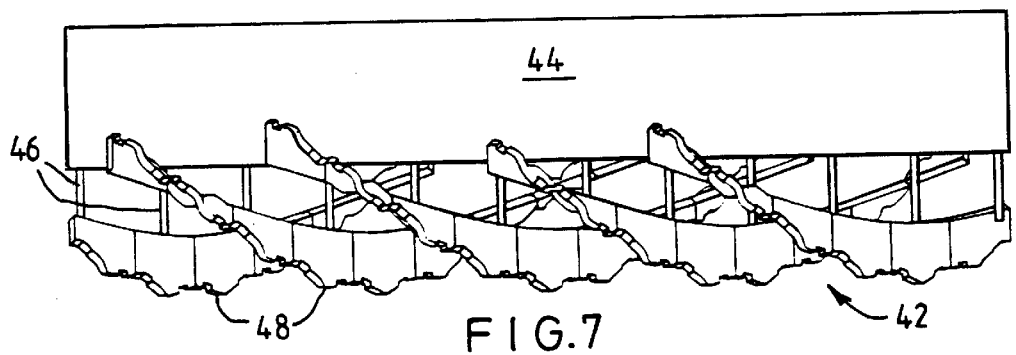
FIG. 7 is a top view of the apparatus of FIG. 6.
Figure 8:
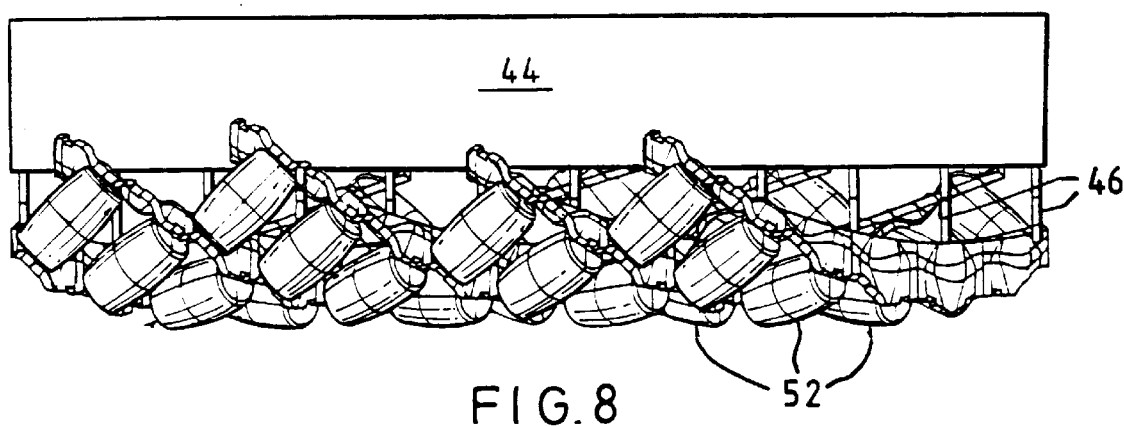
FIG. 8 is a top view of the apparatus of FIG. 6 showing an assembly of guide rollers supported thereon.

FIGS. 6 to 8 show an alternative embodiment of an improved guide roller assembly 40 on improved roller supporting apparatus 42, for the angle station 3. FIGS. 6 and 7 are perspective and top views of the roller supporting apparatus 42 without the assembly of guide rollers mounted thereon, while FIG. 8 shows the supporting apparatus mounting on the guide roller assembly 40.

The roller support apparatus comprises an elongate hollow tube 44 of rectangular cross-section which is provided with a plurality of roller support elements in the form of substantially planar discs 46 extending in a row along one side of the tube 44 in a similar manner to the rings 26 in the first embodiment illustrated in FIGS. 2 and 5. Mounted on the discs 46 are a plurality of axially spaced helical rails 48 having a common axis T passing through the centres of the discs 46, as shown in FIG. 6. The rails are mounted essentially on the thin edges of the discs 46 by welding, bonding or any suitable mechanical fixing means (not shown) such as screws or fastenings.

Each rail is of substantially planar twisted form and is made up from a plurality of individual rail sections 50 which are assembled either directly to the discs 46 or prior to mounting of the rails on the discs. The assembly 40 of guide rollers comprises a multiplicity of guide rollers 52 each having one of its two roller ends mounted on a different one of the rails 48, the rollers 52 being mounted in substantially helical rows between the helical rails, as shown in FIG. 8. Each helical rail is arranged to mount rollers ends on opposite sides of the rail and has notches (not shown) at appropriate positions along its length for location of axial pins or shafts (not shown) passing through the rollers. In the embodiment illustrated in FIGS. 6 to 8 five helical rails 48 are mounted on the discs 46, thus allowing four substantially helical rows of guide rollers 52 to be mounted between the rails.

Figure 9:
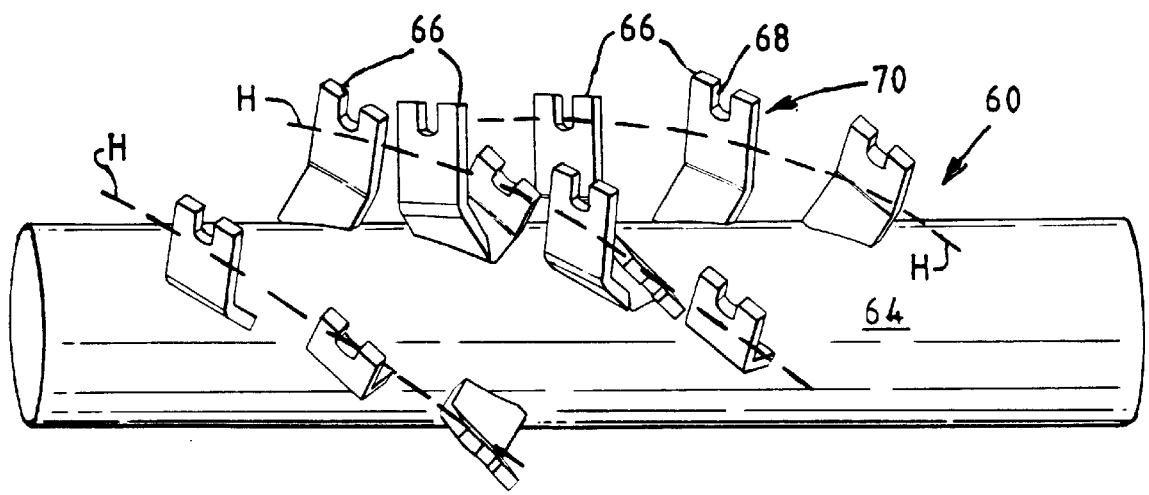
FIG. 9 is a perspective view of a further alternative roller supporting apparatus for an assembly of rollers.

Further embodiments according to a second aspect of the invention are shown in FIGS. 9 to 12. FIG. 9 shows a guide roller assembly mounting apparatus 60 which achieves an extremely close-packed array of guide rollers (not shown). The roller assembly mounting apparatus 62 is a fabricated assembly manufactured in a strong metal such as steel and comprising a hollow substantially cylindrical elongate member 64 on an outer surface of which are integrally mounted a multiplicity of roller mounting elements 66 which are arranged along a plurality of axially spaced substantially helical pathways extending at least partially around the elongate member 64. FIG. 9 shows three such helical pathways H of roller mounting elements 66 but a greater number could be used in order to mount a more extensive array of rollers. Each mounting element 66 is designed to mount one end of a guide roller, a notch 68 being provided in a projecting free end 70 of each element 66 for location of an axial pin of a roller. Alternate ones of the mounting elements 66 in each elical pathway of elements are arranged to mount roller ends of rollers disposed on the same one of two opposite sides of the helical pathway.

Figure 10A:
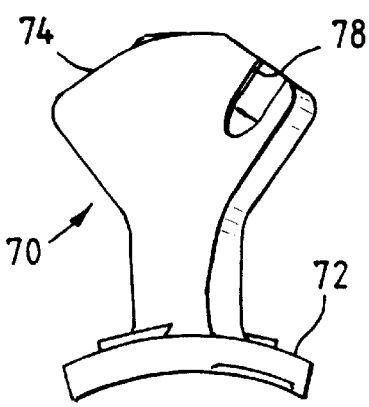
FIGS. 10(a) and (b) are side and top views respectively of a bracket for mounting roller ends of guide rollers according to another embodiment of the invention.
Figure 10B:
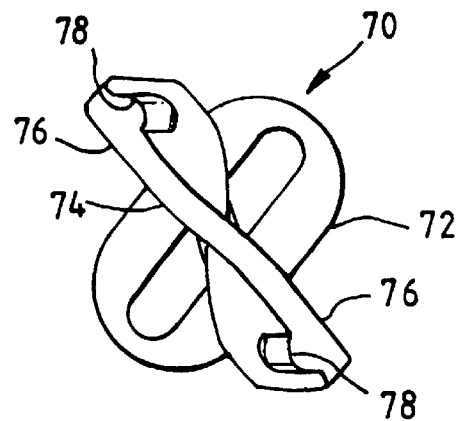

FIGS. 10(*a*) and (*b*) show a guide roller mounting element in the form of a one piece bracket 70 for mounting two ends of respective ones of two different guide rollers. This bracket is designed for mounting directly on an outer surface of a substantially cylindrical elongate member (not shown). An extremely close-packed array of guide rollers can be mounted on the elongate member using brackets of this type in order to provide an improved roller mounting arrangement for the angle station 3 of FIGS. 1 and 2. As shown in FIGS. 10(*a*) and (*b*), each bracket 70 comprises an arcuate base plate 72 for mounting directly to an outer surface of the aforesaid elongate member and an upstanding somewhat T-shaped member 74 of substantially planar twisted form having two wing-like portions 76 each of which is provided with a boss 78 for supporting one end of an axial pin protruding from one of the guide rollers. Each of the two wing-like portion 76 of each bracket is designed to mount a roller end of a roller disposed on an opposite side of the upstanding T-shaped member to the roller mounted by the other wing-like portion. A multiplicity of the brackets 70 are mounted directly on the said elongate member in such that the upstanding somewhat T-shaped members are arranged along substantially helical pathways around the elongate member so that guide rollers can be mounted in substantially helical rows between the upstanding members 74 of the brackets.

The guide rollers used in the embodiments of the invention described hereinbefore are large diameter rollers i.e. rollers having a diameter which is relatively large compared with the diameter of the helical pathways of the roller mounting elements. Typically, the diameter of the rollers is about 0.24 times the diameter of the helical pathway followed by the outermost portions of the roller mounting elements (e.g. brackets, rails etc.) which diameter is itself about 0.55 times the nominal width of the belt.

Figure 11:
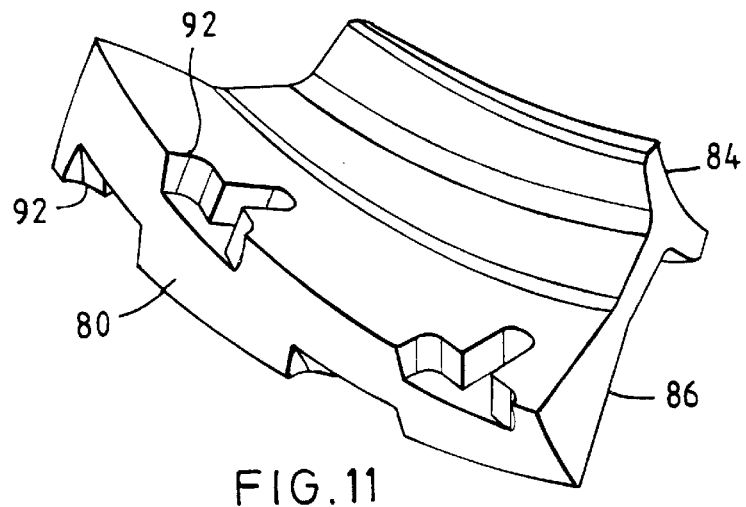
FIG. 11 is a perspective view of an individual portion of a helical rail in accordance with the assembly of FIG. 12.
Figure 12:
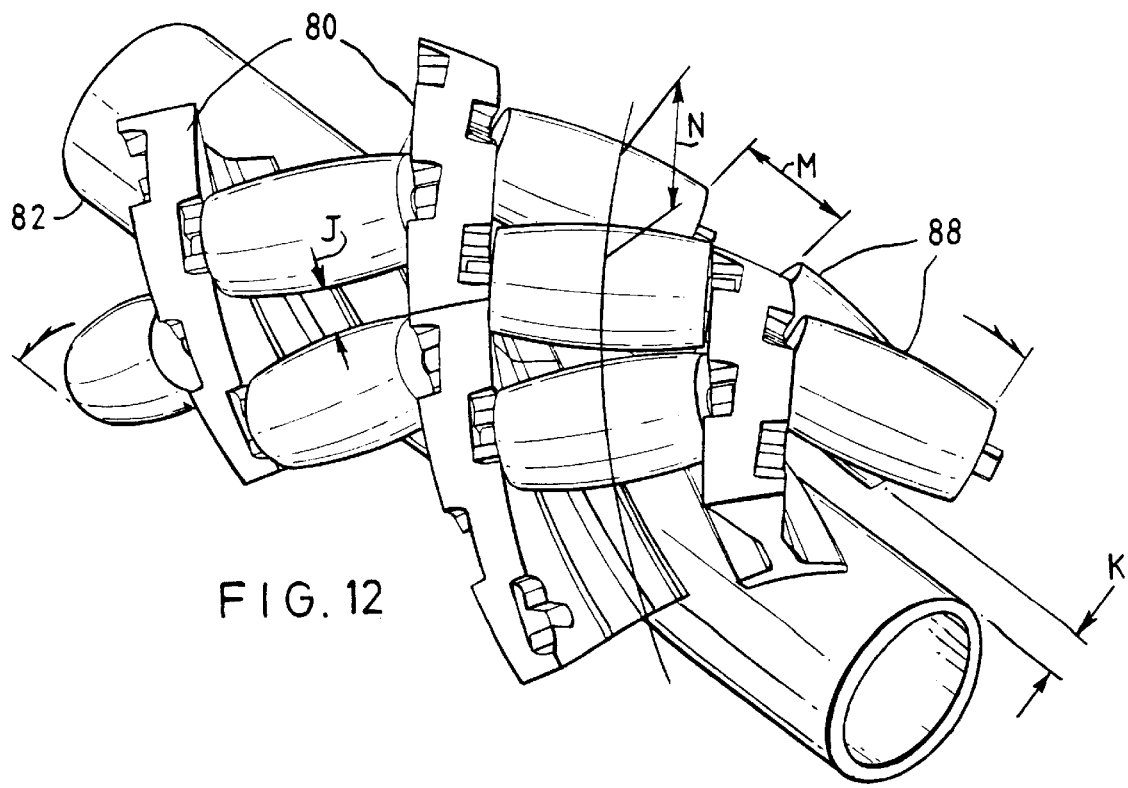
FIG. 12 is a perspective view of an assembly of rollers on a further type of roller supporting apparatus.

FIGS. 11 and 12 show yet another embodiment of a guide roller mounting apparatus which is designed to achieve an extremely close-packed arrangement of rollers in the angle station 3. In this embodiment five helical rails 80 (only three of which are shown in FIG. 12) are mounted directly on an outer surface of a hollow elongate substantially cylindrical member 82. Each helical rail 80 (only three of which are shown in FIG. 12) is made up from a five of identical rail portions 84, one of which is shown in FIG. 11. Each rail portion comprises an arcuate base portion 84 for mounting directly on an outer surface of the cylindrical member 82 and an upstanding rail portion 86 on each side of which roller ends of guide rollers 88 can be mounted. Two spaced substantially T-shaped notches 92 are defined within the upstanding portion 86 of each rail on each side of the upstanding rail, thus allowing each rail 80 to mount axial pins which protrude from roller ends on ones of the rollers 88 disposed laterally on opposite sides of the helical rail.

In FIG. 12 the minimum distance J between the rollers 88 is equal to about 0.07 times the width S of the conveyor belt 2 of the angle station. The gap M between the rollers ends of rollers on opposite sides of a rail is equal to about 0.081 times the width S of the conveyor belt. The distance N between roller crown points of adjacent ones of the cambered rollers is about 0.20 times the width S of the conveyor belt and the minimum distance K between each roller 88 and the outer surface of the hollow elongate member 82 is about 0.047 times the width S of the belt 2.

Figure 13:
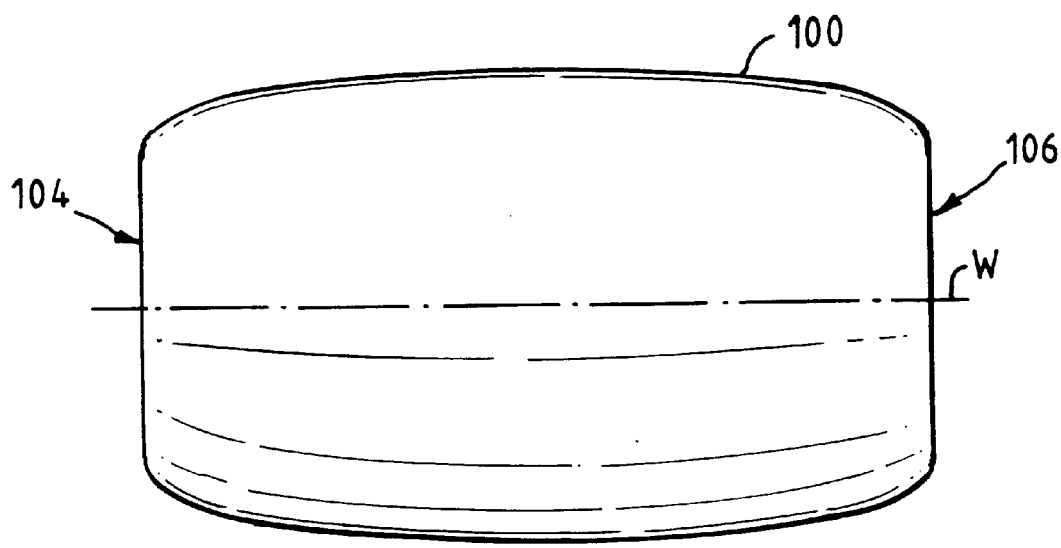
FIG. 13 is a side view of a guide roller in accordance with another aspect of the invention.
Figure 14:
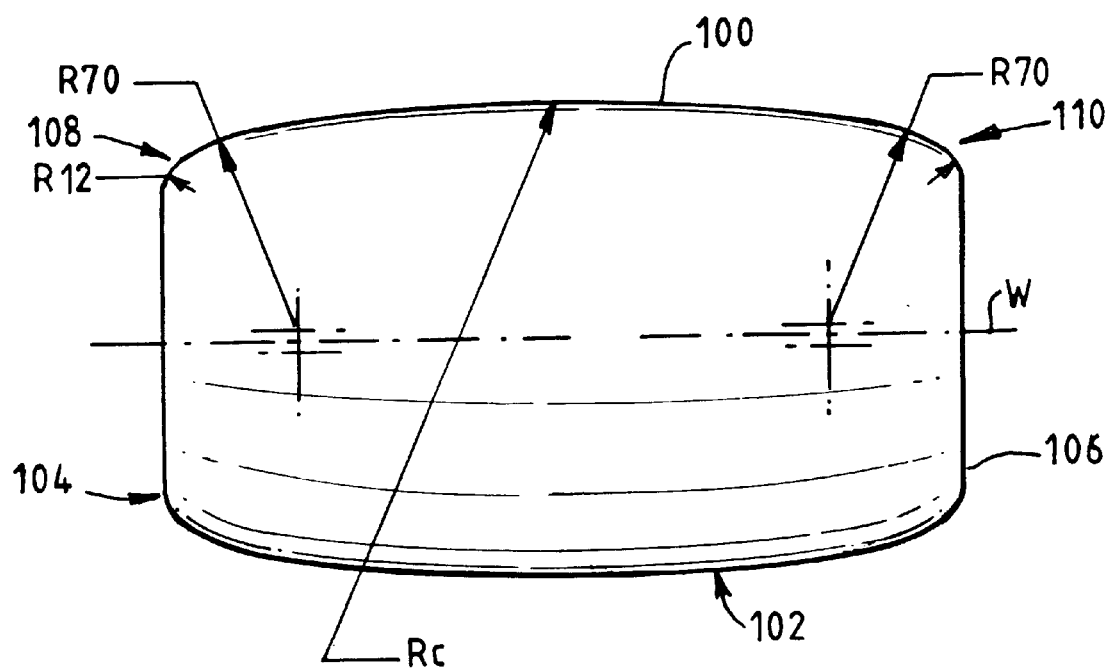
FIG. 14 is a side view of the guide roller of FIG. 13 showing the radius of camber at the edges of the roller.

FIGS. 13 and 14 show an improved guide roller 100 for use in the angle station of FIG. 3 and in the guide roller assemblies illustrated in FIGS. 2, 3, 12, 8 and any of the other roller assemblies described herein. The guide roller 100 has a cambered substantially cylindrical outer surface 102 which makes contact with the conveyor belt 2 in use of the angle station 3. The roller 100 also has two end surface 104, 106 which meet the cambered surface 102 at respective rounded edges 108, 110. The roller is mounted for rotational movement about its axis W on a roller support apparatus in the angle station.

The radius of curvature of the rounded edges 108, 110 of the roller decreases from 0.106 to 0.018 times the radius Rc of the camber as the camber surface 102 approaches the end faces 104, 106 of the roller. The radius Rc of the camber is 660 mm for the roller of FIGS. 13 and 14 and thus the radius of the curvature of the rounded edges 108, 110 decreases from 70 mm (R70) to 12 mm (R12) as the cambered surface 102 approaches the end faces 104, 106 of the roller. The outer diameter of the roller at its point of greatest magnitude, halfway along the length of the roller, is about 0.24 times the diameter of the helical pathway followed by the roller mounting elements. At its smallest magnitude, at the ends of the roller, the outer diameter is about 0.17 times the diameter of the helical pathway. This diameter is chosen to be equal to the radius Rc of the camber of the rollers i.e. 660 mm for the rollers of FIGS. 13 and 14. The length of the roller is about 0.22 times the nominal width of the belt 2. This length would thus be about 265 mm where the width of the conveyor belt 2 is about 1200 mm.

Figure 15:
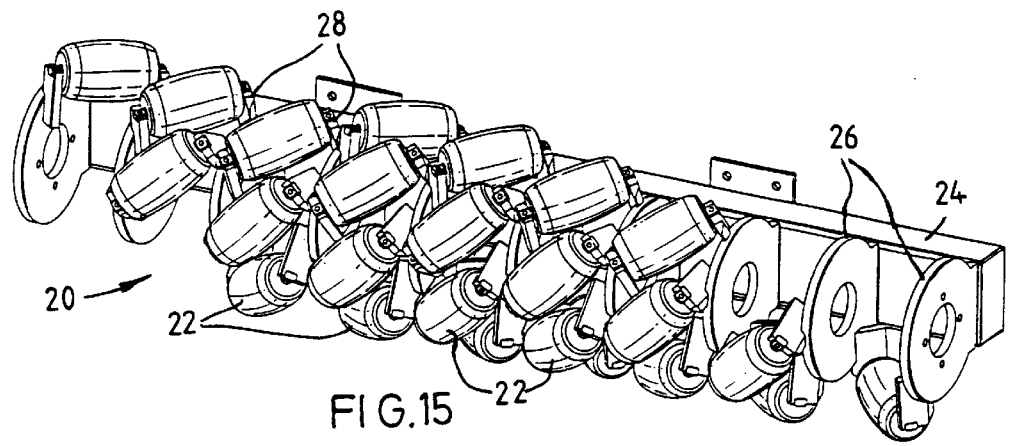
Figure 16:
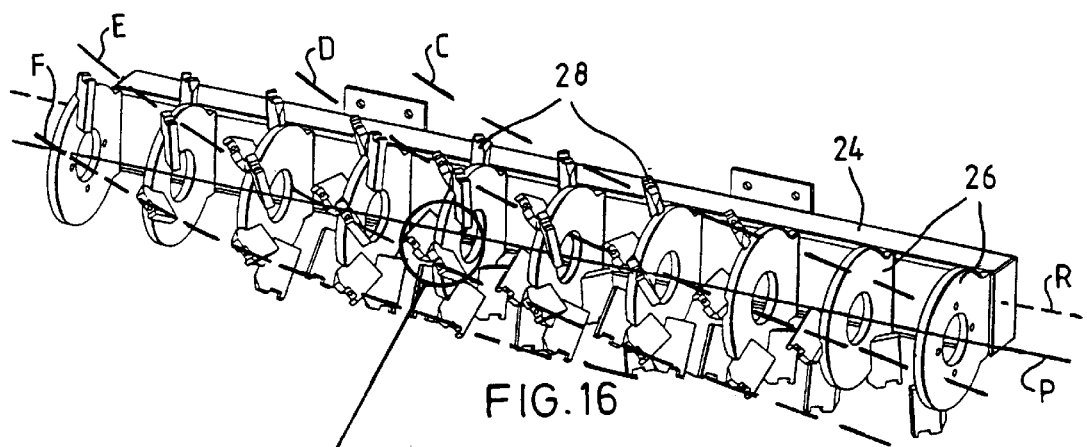

FIG. 15 shows a further improved assembly of guide rollers 20 mounted on improved supporting apparatus, for the angle station 3 of FIG. 1 (*a*) and FIG. 2(*a*) in accordance with the present invention. The assembly, is described with like reference numbers to those used in relation to the assembly in FIG. 3 (*a*), and comprises a multiplicity of guide rollers 22 mounted on a roller supporting apparatus in the form of and elongate hollow tube of rectangular cross section which is provided with a plurality of roller support elements in the form of substantially planar rings which project laterally from the outer surface of the hollow tube (as with FIG. 3(*a*)). A multiplicity of roller mounting brackets 28 are mounted on the rings 26. The brackets 28 extend along a plurality of helical pathways C,D,E,F (indicated by broken lines) having a common axis P which passes through the centres of the rings as illustrated in FIG. 16 where, for clarity the guide rollers have been omitted. The axis P is laterally offset spaced from the axis R of the hollow tube 24.

The brackets 28 of this further embodiment are in the form of flat metal plates which have machined surfaces to mate with the surface of the planar rings 26. Each bracket 28 serves to mount one end of a roller. This is distinct from the arrangement shown in FIG. 3 and 4 wherein the bracket is configured substantially in the shape of a whale's tail, and is arranged to mount two roller ends of respective ones of two separate rollers, each roller end being mounted on respective one of the two fin like portions of the whale's tail bracket.

Figure 17:
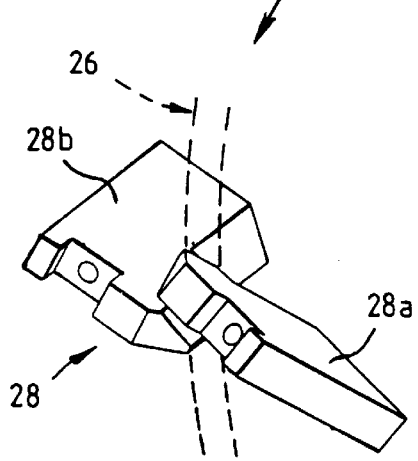
Figure 18:
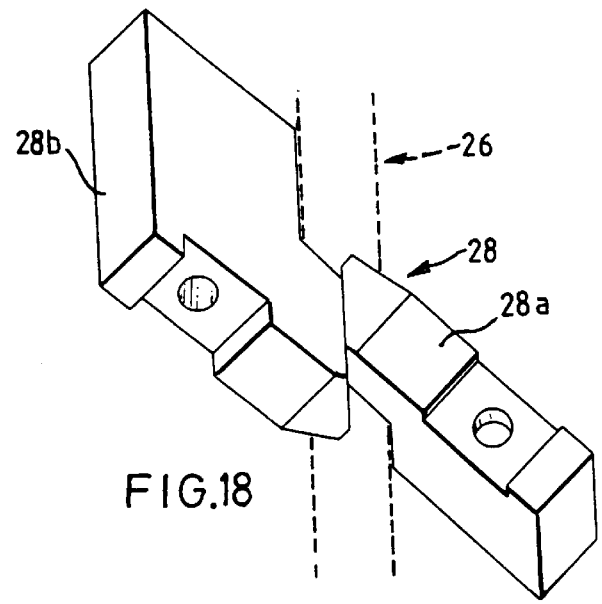

FIG. 17 shows in an enlarged perspective view the mounting of the brackets 28 to the ring 26. (Shown in broken line). Each ring is capable of supporting at least one bracket on each side, and as shown in FIG. 18 which is a front elevation showing two mounting brackets 28*a*, 28*b* arranged on either side of a ring 26 (shown in broken line).

FIG. 19 is a further end elevation showing a disk having mounted thereon a plurality of brackets 28 and FIG. 20 is a side view of the ring shown in FIG. 19. FIG. 21 is a perspective view of the ring and brackets shown in FIGS. 19 and 20 and shows the axes of rotation W of rollers which would be supported thereon.

FIG. 22 is an enlarged perspective view of one bracket 28 for use in the improved assembly of guide rollers according to the present invention. It will be seen and appreciated from FIGS. 17–22 that by varying the angle of the disc mating surface A with respect to the side walls 29 which are perpendicular to the axes of rotation W of a roller in use mounted on a bracket 28, it is possible to vary the helical pathway Z of the belt 2 (see FIGS. 1). This particular embodiment and type of bracket has the advantage over the whale's tail brackets shown with reference to FIGS. 3–5 that it is possible to make angle stations having a wide variety of different helical pathways as may be required for different applications, by simply machining a different angled face A A, rather than having to manufacture the relatively complex whale's tail bracket.

The brackets 28 described above with reference to FIGS. 15–22 are simply and conveniently welded onto the planar rings 26. The brackets are provided with a nose portion 31 which abuts against a corresponding nose portion on a bracket on the other side of the mounting plate 26. It will be appreciated though and as will be seen from FIGS. 15 and 16 that the planar rings at each end of the hollow tube require to support only one end of a roller and in these cases only one bracket is mounted onto the ring 26.

Figure 23:
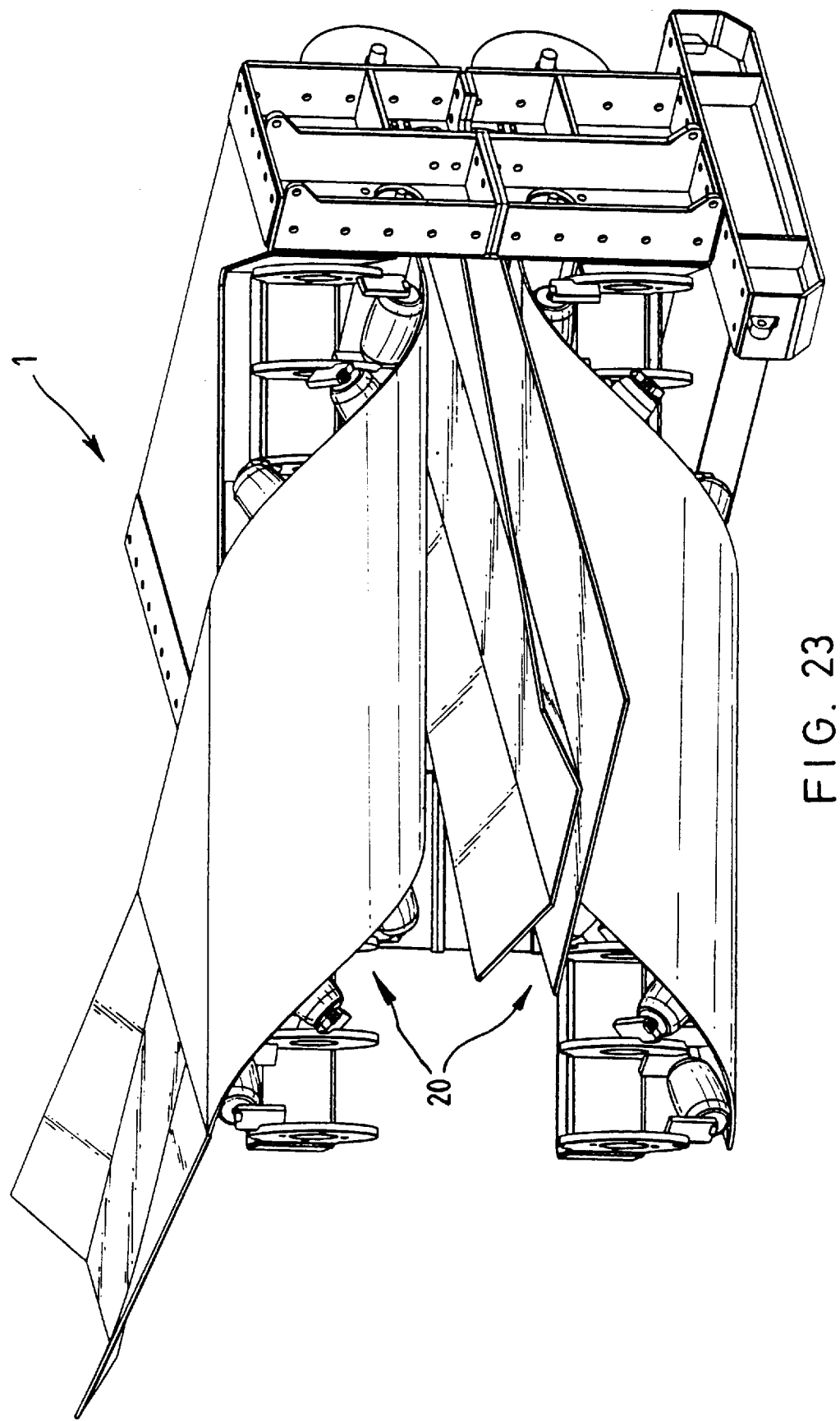

FIG. 23 shows an angle station 1 having the improved assembly of guide rollers 20 mounted on the improved supporting apparatus shown in FIGS. 15 and 16.

Various modifications may be made to the abovedescribed embodiments without detracting from the scope of the present invention. Thus for example the roller mounting element 66 as shown in FIG. 9 may be of an extended length so that the helical pathways having a common axis is laterally offset and spaced from the axis of the support member 64.

What is claimed is:

1. An angle station for lateral angular displacement of an endless conveyor belt in a conveyor system, which angle station comprises a belt guide means in the form of a multiplicity of guide rollers mounted on roller support means, with said guide rollers arranged in an axially and laterally extending array, so as to define a generally continuously curved support for said conveyor belt in use of the angle station characterised in that said roller support means comprises an elongate support member provided with a plurality of roller support elements mounting roller mounting members which are arranged along a plurality of axially spaced substantially helical pathways, said roller support elements projecting from said elongate support member and said elongate support member being laterally offset and spaced from a common longitudinal axis of said helical pathways for said roller mounting members so that the space radially inwards of said helical pathways is substantially unobstructed whereby build-up of particulate material around the rollers is substantially avoided.

2. An angle station as claimed in claim 1 wherein a plurality of the roller mounting members of at least one of said helical pathways of roller mounting members are each formed and arranged for mounting roller ends of rollers disposed laterally on opposite sides of said at least one helical pathway.

3. An angle station as claimed in claim 1 wherein said roller support elements are in the form of disks or rings on which said roller mounting members are mounted.

4. An angle station as claimed in claim 3 wherein said disks or rings project laterally from an outer face of the elongate support member such that the plane of each disk or ring is substantially normal to the longitudinal axis of said helical pathways for the roller mounting portions.

5. An angle station as claimed in claim 3 wherein each of said disks or rings is disposed substantially vertically on a substantially horizontal elongate support member.

6. An angle station as claimed in claim 1 wherein said elongate support member is in the form of a tubular member.

7. An angle station as claimed in claim 1 wherein said guide rollers have a diameter of from 0.18 to 0.30 times the diameter of the helical pathway.

8. An angle station as claimed in claim 1 wherein each of said guide rollers is mounted at its ends, for rotational movement about its own axis, on respective ones of two said roller mounting members mounted on the roller support elements.

9. An angle station as claimed in claim 1 wherein said roller mounting members comprise a plurality of brackets mounted on said roller support elements, each one of said brackets being formed and arranged for mounting one end of at least one said roller.

10. An angle station as claimed in claim 9 wherein at least some of said roller mounting members each comprise a bracket comprising a first portion for mounting one end of one said roller and a second portion for mounting one end of another said roller.

11. An angle station as claimed in claim 10 wherein said first and second portions are formed and arranged for mounting said one and said another rollers with their axes at an angle to each other.

12. An angle station as claimed in claim 10 wherein said first and second portions are formed separately from each other.

13. An angle station as claimed in claim 1 wherein said roller mounting members comprise a plurality of generally planar mounting blocks each one of said mounting blocks being formed and arranged for mounting one end of a one of said rollers, which blocks are mounted on the roller support elements at an angle to the principal plane thereof.

14. An angle station as claimed in claim 13, wherein said mounting blocks each have an angled edge face in engagement with a side face of one of said disks or rings.

15. An angle station as claimed in claim 14 wherein said mounting blocks each have a nose portion overhanging said angled edge face for engagement with a peripheral edge portion of one of said disks or rings.

16. An angle station as claimed in claim 3 wherein said roller mounting Member is formed and arranged with a slot in its base portion formed and arranged for slotted engagement with a peripheral edge portion of said disk or ring.

* * * * *